(12) United States Patent
Imai

(10) Patent No.: US 11,590,648 B2
(45) Date of Patent: Feb. 28, 2023

(54) ROBOT SYSTEM, CONTROL APPARATUS, AND CONTROL METHOD

(71) Applicant: Seiko Epson Corporation, Tokyo (JP)

(72) Inventor: Ryosuke Imai, Matsumoto (JP)

(73) Assignee: SEIKO EPSON CORPORATION

( * ) Notice: Subject to any disclaimer, the term of this patent is extended or adjusted under 35 U.S.C. 154(b) by 162 days.

(21) Appl. No.: 16/797,132

(22) Filed: Feb. 21, 2020

(65) Prior Publication Data

US 2020/0269419 A1 Aug. 27, 2020

(30) Foreign Application Priority Data

Feb. 22, 2019 (JP) .............................. JP2019-030235

(51) Int. Cl.
  *B25J 9/04* (2006.01)
  *B25J 9/12* (2006.01)
  *B25J 13/08* (2006.01)
  *B25J 9/00* (2006.01)

(52) U.S. Cl.
  CPC ............... *B25J 9/12* (2013.01); *B25J 9/0012* (2013.01); *B25J 9/044* (2013.01); *B25J 13/088* (2013.01)

(58) Field of Classification Search
  CPC ... B25J 9/0012; B25J 9/044; B25J 9/12; B25J 13/088
  See application file for complete search history.

(56) References Cited

U.S. PATENT DOCUMENTS

| 5,049,029 A | 9/1991 | Mitsui et al. |
| 2012/0035763 A1* | 2/2012 | Motoyoshi ............ B25J 9/1694 700/258 |
| 2012/0215357 A1 | 8/2012 | Igarashi et al. |
| 2013/0190926 A1* | 7/2013 | Motoyoshi ............ B25J 9/1607 700/254 |
| 2014/0067119 A1* | 3/2014 | Gomi .................... B25J 9/1651 700/253 |
| 2017/0028554 A1* | 2/2017 | Gomi .................... B25J 13/088 |
| 2017/0120444 A1* | 5/2017 | Motoyoshi ............... B25J 9/046 |
| 2020/0030964 A1* | 1/2020 | Nakayama ................ B25J 9/02 |

FOREIGN PATENT DOCUMENTS

| JP | H01-157547 A | 6/1989 |
| JP | H10-100085 A | 4/1998 |
| JP | 2000-141272 A | 5/2000 |
| JP | 2012-171052 A | 9/2012 |
| JP | 2013-146827 A | 8/2013 |
| JP | 2017-056542 A | 3/2017 |

* cited by examiner

*Primary Examiner* — Dale Moyer
(74) *Attorney, Agent, or Firm* — Harness, Dickey & Pierce, P.L.C.

(57) ABSTRACT

A robot system includes a robot having an arm including a first arm coupled to a base and pivoting about a first pivot axis and a second arm coupled to the first arm and pivoting about a second pivot axis parallel to the first pivot axis, and a first motor pivoting the first arm about the first pivot axis, and a control apparatus having a first motor control unit that controls the first motor. The robot has an inertial sensor that detects an angular velocity about a roll axis of the arm or an acceleration in a tangential direction of a circle around the roll axis, and the first motor control unit controls the first motor based on the angular velocity or acceleration.

11 Claims, 10 Drawing Sheets

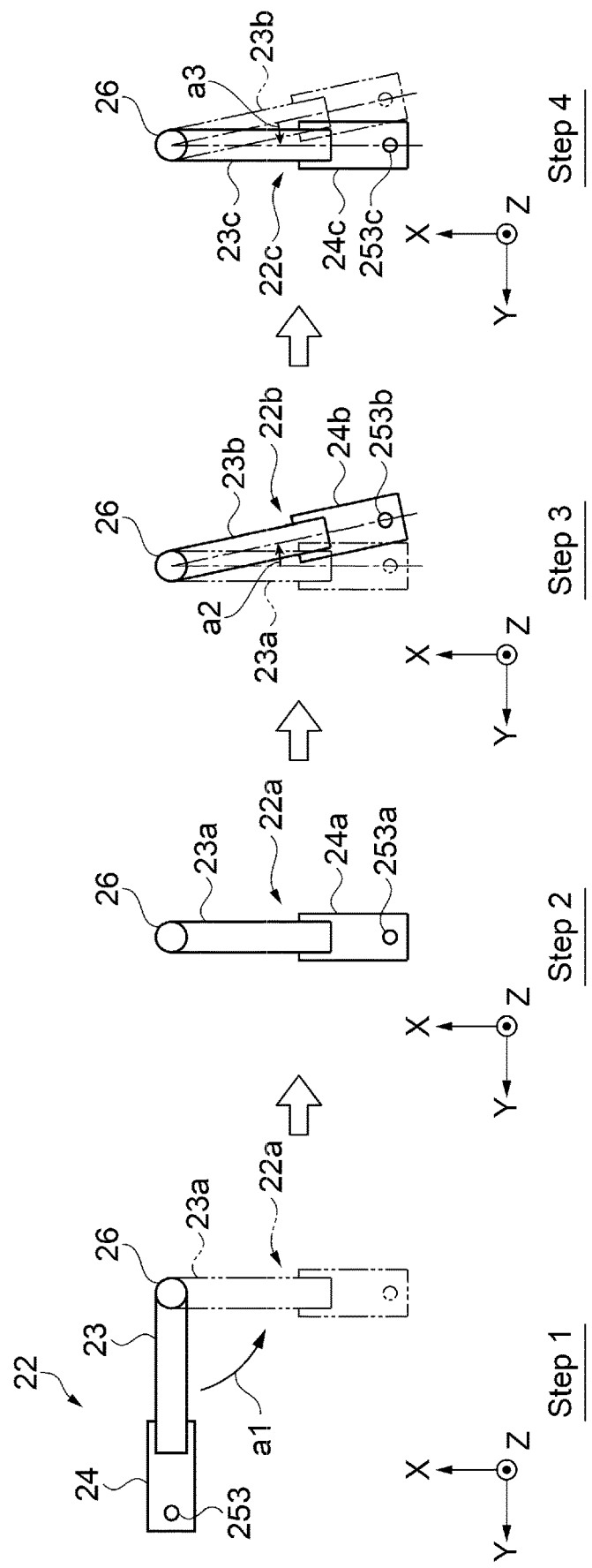

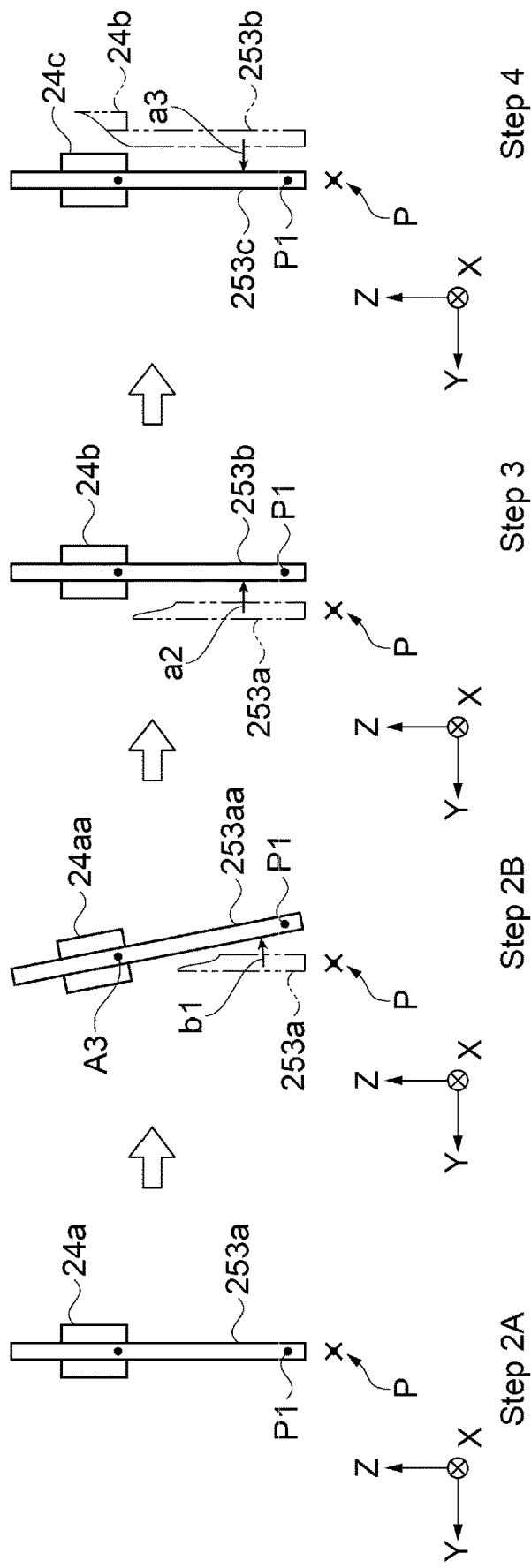

ROBOT SYSTEM, CONTROL APPARATUS, AND CONTROL METHOD

The present application is based on, and claims priority from JP Application Serial Number 2019-030235, filed Feb. 22, 2019, the disclosure of which is hereby incorporated by reference herein in its entirety.

BACKGROUND

1. Technical Field

The present disclosure relates to a robot system, control apparatus, and control method.

2. Related Art

In related art, as a robot conveying components etc., for example, JP-A-2012-171052 discloses a horizontal articulated robot also called a scalar robot. The robot described in JP-A-2012-171052 has a base, a first arm coupled to an upper end portion of the base and pivoting around an axial center along a vertical direction relative to the base, a second arm coupled to a distal end portion of the first arm and pivoting around an axial center along the vertical direction relative to the first arm, and a spline shaft provided in a distal end portion of the second arm and displaced relative to the second arm. Further, an angular velocity sensor that measures an angular velocity of the second arm relative to the base is placed within the second arm.

The actuation of the robot having the above described configuration is controlled by a control apparatus. The control apparatus may calculate an angular velocity of the first arm based on various signals input from the angular velocity sensor etc. placed within the second arm, and control a motor that pivots the first arm so as to suppress vibration of the second arm as vibration in horizontal directions.

In the robot described in JP-A-2012-171052, the vibration generated in the second arm includes vibration about an axis along the longitudinal direction of the second arm in the so-called roll direction in addition to the vibration in the horizontal directions. In the robot described in JP-A-2012-171052, as described above, the vibration of the second arm in the horizontal directions is suppressed, however, suppression of the vibration about the axis along the longitudinal direction of the second arm is not considered.

SUMMARY

A robot system according to this application includes a robot having a base, an arm including a first arm coupled to the base and pivoting about a first pivot axis and a second arm coupled to the first arm and pivoting about a second pivot axis parallel to the first pivot axis, a first motor pivoting the first arm about the first pivot axis, and a second motor pivoting the second arm about the second pivot axis, and a control apparatus having a first motor control unit that controls the first motor, wherein the robot has an inertial sensor that detects an angular velocity about a roll axis of the arm or an acceleration in a tangential direction of a circle around the roll axis, and the first motor control unit controls the first motor based on output from the inertial sensor.

In the above described robot system, the inertial sensor may be provided in the second arm.

In the above described robot system, a member forming an outer surface of the first arm may contain a resin.

In the above described robot system, the first motor control unit may have a velocity control part that velocity-controls the first motor based on the output from the inertial sensor.

In the above described robot system, the first motor control unit may have a position control part that position-controls the first motor, and the velocity control part may reduce the angular velocity by the velocity control and the position control part may move the second arm to a target position by the position control.

A control apparatus according to this application is a control apparatus controlling a robot having a base, an arm including a first arm coupled to the base and pivoting about a first pivot axis and a second arm coupled to the first arm and pivoting about a second pivot axis parallel to the first pivot axis, a first motor pivoting the first arm about the first pivot axis, and a second motor pivoting the second arm about the second pivot axis, and including a first motor control unit that controls the first motor, wherein the robot has an inertial sensor that detects an angular velocity about a roll axis of the arm or an acceleration in a tangential direction of a circle around the roll axis, and the first motor control unit controls the first motor based on the angular velocity or the acceleration.

In the above described control apparatus, the first motor control unit may have a velocity control part that velocity-controls the first motor based on output from the inertial sensor.

In the above described control apparatus, the first motor control unit may perform position control of controlling a position of the first motor, reduce the angular velocity by the velocity control, and move the second arm to a target position by the position control.

A control method according to this application is a control method of controlling a robot having an arm, a motor pivoting the arm, and an inertial sensor provided in the arm, including a detection step of detecting an angular velocity about a roll axis of the arm or an acceleration in a tangential direction of a circle around the roll axis using the inertial sensor, and a control step of controlling the motor based on the detected angular velocity or acceleration.

In the above described control method, at the control step, a velocity of the motor may be controlled based on output from the inertial sensor.

In the above described control method, at the control step, the angular velocity may be reduced by the velocity control and the arm may be moved to a target position by position control of controlling a position of the motor.

BRIEF DESCRIPTION OF THE DRAWINGS

FIG. 5A is a view as seen in a direction of an arrow Q2 in FIG. 1 for explanation of action steps of an arm.

FIG. 5B is a view as seen in a direction of an arrow Q1 in FIG. 1 for explanation of the action steps of the arm.

DESCRIPTION OF EXEMPLARY EMBODIMENTS

As below, a robot system, control apparatus, and control method according to the present disclosure will be explained in detail based on preferred embodiments shown in the accompanying drawings. The following embodiments do not unduly limit the details of the present disclosure described in the appended claims. Further, not all configurations described in the embodiments are essential component elements of the present disclosure.

In FIGS. 1, 2, 5A, 5B, and 6 of the drawings referred to as below, for convenience of explanation, an X-axis, a Y-axis, and a Z-axis as three axes orthogonal to one another are shown by arrows, and the head sides of the arrows are referred to as "+ (plus)" and tail sides are referred to as "- (minus)". Further, hereinafter, directions parallel to the X-axis are referred to as "X-directions", directions parallel to the Y-axis are referred to as "Y-directions", and directions parallel to the Z-axis are referred to as "Z-directions". Furthermore, hereinafter, for convenience of explanation, the +Z-direction side as the upside in FIG. 1 may be referred to as "upper" and the -Z-direction side as the downside may be referred to as "lower".

As below, the XY-plane containing the X-axis and the Y-axis is horizontal and the Z-axis is along the vertical direction. Here, "horizontal" in this specification is not limited to the completely horizontal state, but includes states with inclinations within e.g. 5° relative to the horizontal state unless conveyance of electronic components is hindered. Similarly, in this specification, "vertical" is not limited to the completely vertical case, but includes cases with inclinations within e.g. ±5° relative to the vertical case. Further, in this specification, "parallel" includes not only the case where two lines (including axes) or surfaces are completely parallel to each other, but includes cases with inclinations within e.g. ±10°. Furthermore, in this specification, "orthogonal" includes not only the case where two lines (including axes) or surfaces are completely orthogonal to each other, but includes cases with inclinations within e.g. ±10°.

Figure 1:
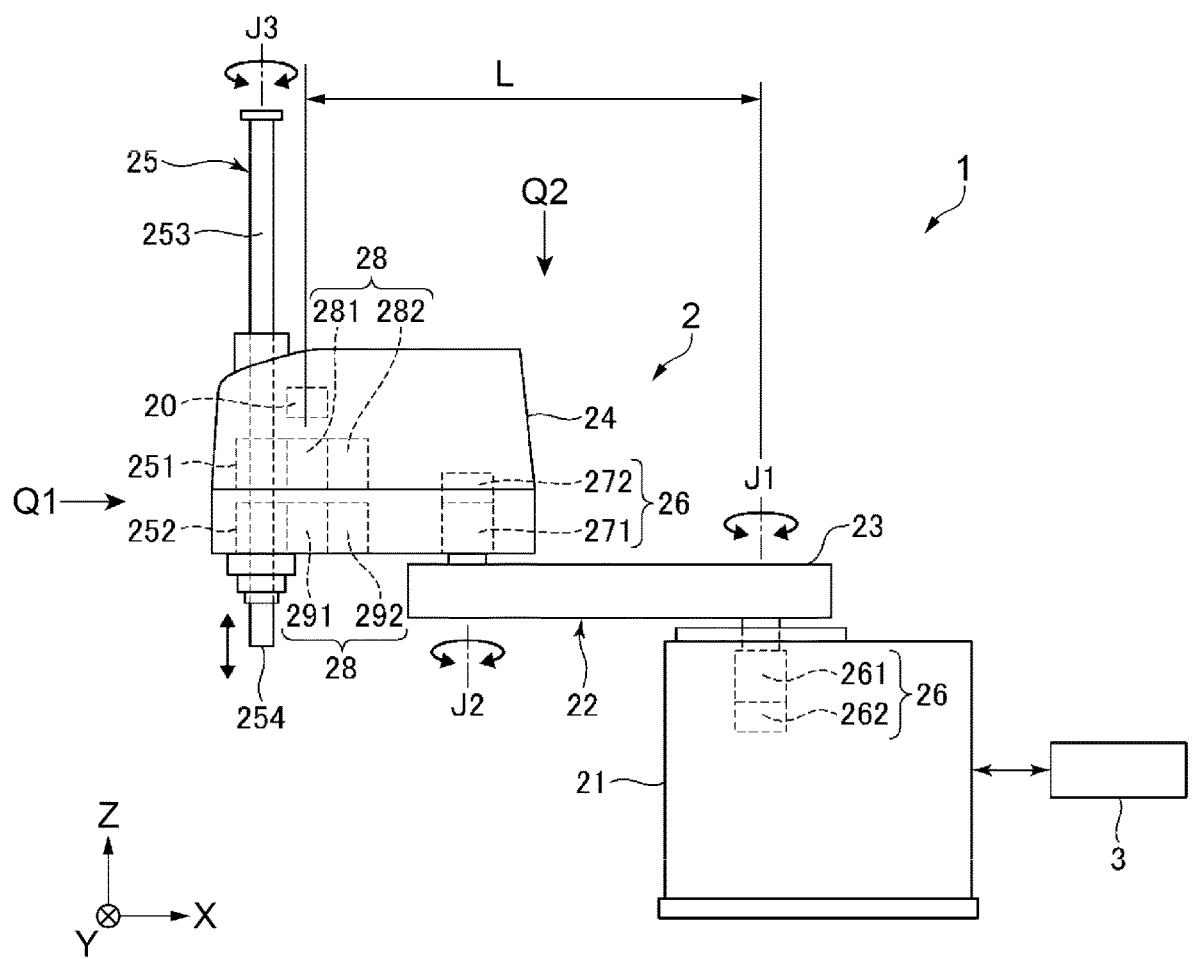
FIG. 1 shows an overall configuration of a robot system according to a first embodiment.
Figure 2:
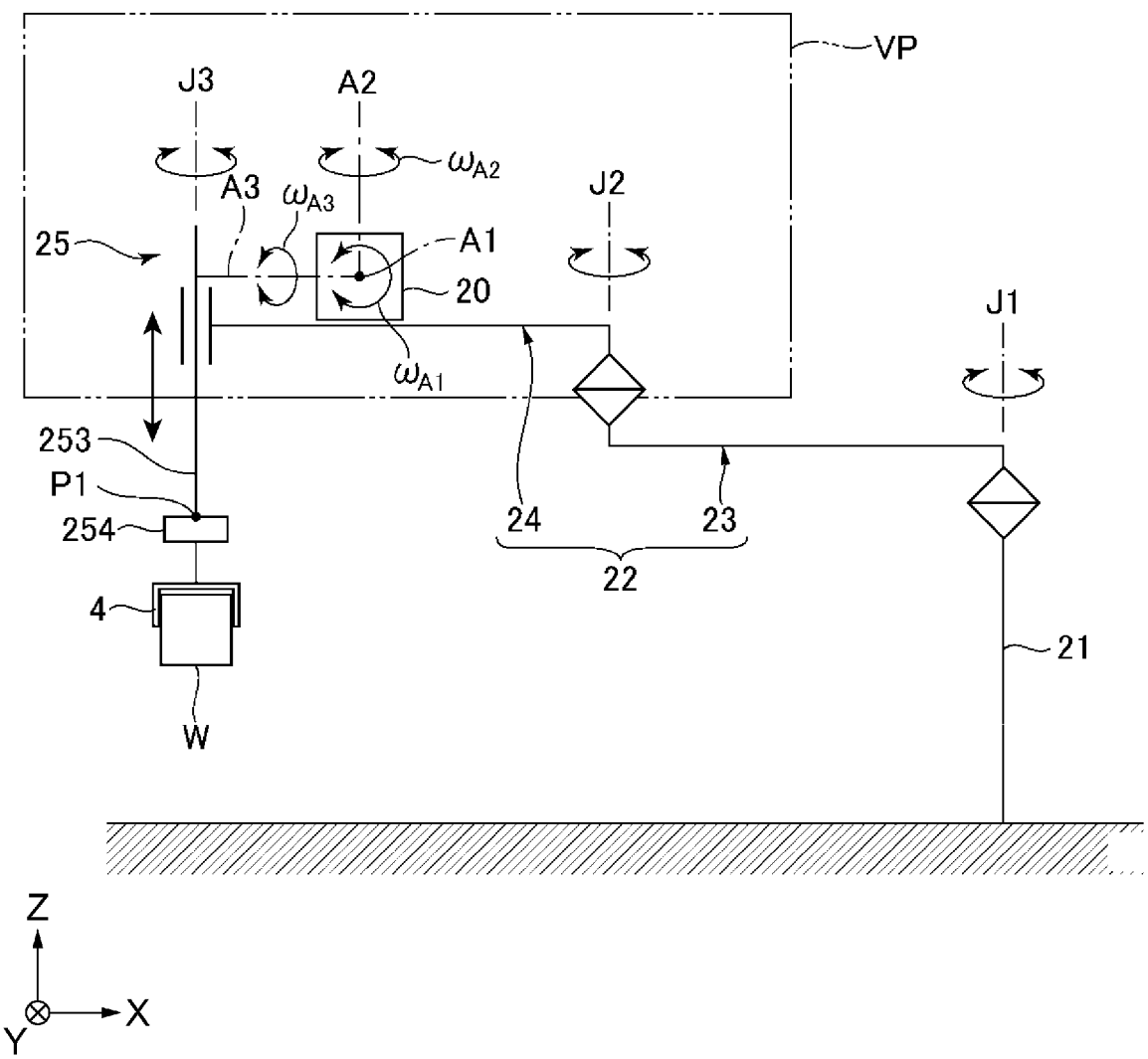
FIG. 2 is a schematic diagram of a robot applied to the robot system according to the first embodiment.

1. First Embodiment 1.1. Overall Configuration of Robot System according to First Embodiment First, the configuration of the robot system according to the first embodiment will be explained with reference to FIGS. 1, 2, and 3. FIG. 1 shows the overall configuration of the robot system according to the first embodiment. FIG. 2 is the schematic diagram of the robot applied to the robot system according to the first embodiment. Note that the illustration of an end effector is omitted in FIG. 1. Further, FIG. 2 schematically shows the end effector and an object.

As shown in FIGS. 1 and 2, a robot system 1 according to the first embodiment includes a robot 2 and a control apparatus 3 controlling the robot 2. Thereby, the robot system 1 may have advantages of the control apparatus 3 to be described later. The usage of the robot system 1 is not particularly limited, but the robot system may be used for respective work including e.g. holding, conveyance, assembly, inspection, etc. of objects such as electronic components and electronic apparatuses.

The robot 2 is a horizontal articulated robot also called a scalar robot, and has a base 21, an arm 22 provided on the base 21 and being pivotable about a first pivot axis J1 as a pivot axis relative to the base 21, and a working head 25 provided in the arm 22. Further, the robot 2 has an arm drive unit 26 that drives the arm 22 about a second pivot axis J2 as a pivot axis, and a working head drive unit 28 that drives the working head 25. Furthermore, the robot 2 has a spline shaft 253 as a shaft provided in a different position from that of the second pivot axis J2, moving in parallel to the second pivot axis J2 in the working head 25, and provided with an end effector 4 at lower one end side thereof, and an angular velocity sensor 201 (see FIG. 3) as an example of an inertial sensor 20 provided in the arm 22 and detecting an angular velocity ωA3 about a third angular velocity detection axis A3 which is a roll axis of the arm 22 and an axis orthogonal to the axial direction of the second pivot axis J2 and parallel to a virtual plane VP as a plane containing the second pivot axis J2 and a third pivot axis J3 as a pivot axis of the spline shaft 253.

Figure 3:
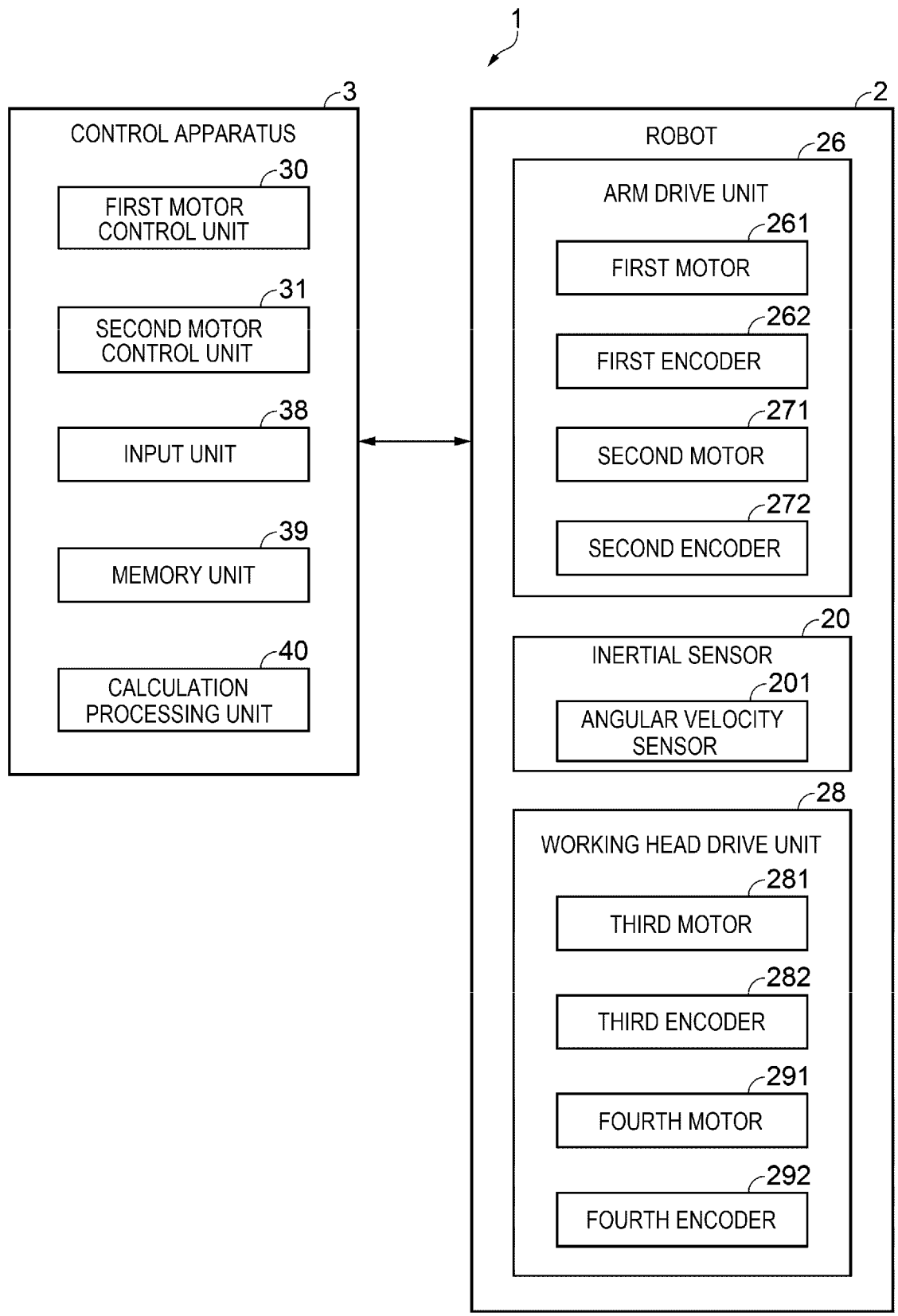
FIG. 3 is a block diagram showing a control system of the robot system according to the first embodiment.

The control apparatus 3 includes a first motor control unit 30 that controls actuation of a first motor 261 and a second motor control unit 31 that controls actuation of a second motor 271 contained in the arm drive unit 26 (see FIG. 3). When the arm 22 pivots about the second pivot axis J2, the first motor control unit 30 performs the so-called feedback control of controlling the first motor 261 based on the angular velocity ωA3 detected by the angular velocity sensor 201. The first motor control unit 30 controls the actuation of the first motor 261 by the feedback control, and thereby, may suppress vibration generated in the spline shaft 253 of the working head 25, e.g. vibration of a control point P1 at the end effector 4 side generated in the spline shaft 253.

According to the robot system 1, as will be described later, the vibration of the arm 22 after the arm 22 pivots about the first pivot axis J1 and stops may be suppressed, and e.g. the position of the control point P1 of the spline shaft 253 may be maintained as fixed as possible. Thereby, when an object W is gripped by the end effector 4, the gripping may be stably performed.

As below, the configuration of the robot 2 will be explained further in detail.

The base 21 is fixed to e.g. a floor surface (not shown) by bolts or the like. The arm 22 has a first arm 23 coupled to the base 21 and being pivotable about the first pivot axis J1 relative to the base 21, and a second arm 24 provided in the distal end portion of the first arm 23 and pivotably coupled about the second pivot axis J2 parallel to the first pivot axis J1 relative to the first arm 23.

Note that it is preferable that the first arm 23 contains a member having flexibility of e.g. a resin or the like in a member forming the outer surface thereof. As the resin, e.g. thermoplastic resin including polyvinyl chloride and polyethylene, thermosetting resin including phenol resin and melamine resin, natural rubber, synthetic rubber, or the like may be exemplified. A resin or the like is used for the outer surface of the first arm 23, and thereby, contact impact when the pivoting first arm 23 comes into contact with another part may be reduced by buffer action due to flexibility of the resin. Note that the arm 22 performs feedback control on the first motor 261 based on the angular velocity ωA3 detected by the angular velocity sensor 201 to control the actuation of the first motor 261, and thereby, may suppress vibration generated in the spline shaft 253 of the working head 25. Therefore, as described above, the arm 22 even with the first arm 23 having the outer surface formed by a soft resin does not increase the vibration generated in the spline shaft 253 of the working head 25.

The first motor 261 that pivots the first arm 23 about the first pivot axis J1 as the pivot axis thereof relative to the base 21 is provided within the base 21. Further, a first encoder 262 as an angle sensor that detects an amount of rotation of the first motor 261 is provided in the first motor 261, and a pivot angle of the first arm 23 relative to the base 21 may be detected by the output from the first encoder 262.

The second motor 271 that pivots the second arm 24 about the second pivot axis J2 as the pivot axis thereof relative to the first arm 23 is provided within the second arm 24. Further, a second encoder 272 as an angle sensor that detects an amount of rotation of the second motor 271 is provided in the second motor 271, and a pivot angle of the second arm 24 relative to the first arm 23 may be detected by the output from the second encoder 272. As shown in FIG. 3, the arm drive unit 26 has the first motor 261, the first encoder 262, the second motor 271, and the second encoder 272.

The working head 25 is provided in a distal end portion of the second arm 24, i.e., in a different position from that of the second pivot axis J2 as the pivot axis of the second arm 24. The working head 25 has a spline nut 251 and a ball screw nut 252 coaxially placed in the distal end portion of the second arm 24, and the spline shaft 253 inserted through the spline nut 251 and the ball screw nut 252.

The spline shaft 253 is pivotable about the third pivot axis J3 as the center axis thereof and reciprocable in directions along the third pivot axis J3, in other words, directions parallel to the third pivot axis J3 relative to the second arm 24. Note that the first pivot axis J1, the second pivot axis J2, and the third pivot axis J3 are parallel to one another and each along the vertical direction.

Further, a third motor 281 that rotates the spline nut 251 to rotate the spline shaft 253 about the third pivot axis J3 is provided within the second arm 24. A third encoder 282 as an angle sensor that detects an amount of rotation of the third motor 281 is provided in the third motor 281, and an amount of rotation of the spline shaft 253 relative to the second arm 24 may be detected by the output from the third encoder 282. Furthermore, a fourth motor 291 that rotates the ball screw nut 252 to move the spline shaft 253 in the direction along the third pivot axis J3 is provided within the second arm 24. A fourth encoder 292 as an angle sensor that detects an amount of rotation of the fourth motor 291 is provided in the fourth motor 291, and an amount of movement of the spline shaft 253 relative to the second arm 24 may be detected by the output from the fourth encoder 292. As shown in FIG. 3, the working head drive unit 28 has the third motor 281, the third encoder 282, the fourth motor 291, and the fourth encoder 292.

As shown in FIGS. 1 and 2, a payload 254 for attachment of the end effector 4 is provided in the end portion at the lower end side of the spline shaft 253. The end effector 4 to be attached to the payload 254 is not particularly limited to, but includes e.g. a hand holding the object W and a working tool for processing the object W. Note that the holding of the object W with the hand includes gripping and suction.

The angular velocity sensor 201 (see FIG. 3) as the example of the inertial sensor 20 is provided within the second arm 24. Particularly, the angular velocity sensor 201 in the embodiment is provided near the spline shaft 253 as the distal end portion of the second arm 24. Note that a distance between the first pivot axis J1 and the inertial sensor 20, in the configuration, a distance between the first pivot axis J1 and the angular velocity sensor 201 is referred to as "distance L".

As described above, the angular velocity sensor 201 is provided in the distal end portion of the second arm 24 and the distance L between the first motor 261 and the angular velocity sensor 201 is larger, and thereby, the vibration about the third angular velocity detection axis A3 as the roll axis of the second arm 24 may be detected in a part in which the vibration is larger and the detection sensitivity of the angular velocity $\omega A3$ may be improved.

As shown in FIG. 2, when the first arm 23 pivots about the first pivot axis J1 during pivot of the second arm 24 about the second pivot axis J2 or during stoppage of the pivot of the second arm 24, the angular velocity sensor 201 may detect angular velocities about three axes in the second arm 24. As below, "the angular velocity generated about the roll axis of the arm 22 when the first arm 23 pivots about the first pivot axis J1" will be representatively described.

Note that the first axis of the three axes is a first angular velocity detection axis A1, the second axis is a second angular velocity detection axis A2, and the third axis is the third angular velocity detection axis A3 in FIG. 2. It is preferable that the angular velocity sensor 201 is formed by e.g. a gyro sensor.

The first angular velocity detection axis A1 is an axis orthogonal to the virtual plane VP as a plane containing the second pivot axis J2 and the third pivot axis J3, i.e., the paper surface of FIG. 2 and along the Y-axis shown in FIG. 2. The angular velocity about the first angular velocity detection axis A1, in other words, the angular velocity in a pitch direction may be referred to as "first angular velocity $\omega A1$".

The second angular velocity detection axis A2 is an axis orthogonal to the first angular velocity detection axis A1, that is, parallel to the axial direction of the second pivot axis J2 and along the Z-axis shown in FIG. 2. The angular velocity about the second angular velocity detection axis A2, in other words, the angular velocity in a yaw direction may be referred to as "second angular velocity $\omega A2$".

The third angular velocity detection axis A3 is an axis orthogonal to the first angular velocity detection axis A1 and the second angular velocity detection axis A2, that is, orthogonal to the axial direction of the second pivot axis J2, parallel to the virtual plane VP, and along the X-axis shown in FIG. 2. The angular velocity about the third angular velocity detection axis A3, in other words, the angular velocity in the roll direction of the arm 22 may be referred to as "third angular velocity $\omega A3$".

As described above, the angular velocity sensor 201 may detect the first angular velocity $\omega A1$ about the first angular velocity detection axis A1 orthogonal to the virtual plane VP. Thereby, for example, information of the first angular velocity $\omega A1$ may be used for vibration suppression control of the spline shaft 253 in the upward and downward directions along the Z-axis.

Further, the angular velocity sensor 201 may also detect the second angular velocity $\omega A2$ about the second angular velocity detection axis A2 parallel to the second pivot axis J2. Thereby, for example, information of the second angular velocity $\omega A2$ may be used for vibration suppression control of the spline shaft 253 in the horizontal directions.

Furthermore, the angular velocity sensor 201 may detect the third angular velocity $\omega A3$ about the third angular velocity detection axis A3 parallel to the roll axis of the arm 22. The third angular velocity $\omega A3$ is used for vibration suppression control of the spline shaft 253 about the third angular velocity detection axis A3. This control will be described later.

The angular velocity sensor 201 is not particularly limited as long as the sensor may detect an angular velocity. For example, an angular velocity sensor that detects an angular velocity from electric charge generated due to deformation of a piezoelectric material, an angular velocity sensor that detects an angular velocity from a change in capacitance, or the like may be used. Note that, in the embodiment, a quartz crystal vibrator is used as the angular velocity sensor 201. The quartz crystal vibrator has a vibrating arm, and, when an angular velocity about one detection axis of the first angular velocity detection axis A1, the second angular velocity detection axis A2, and the third angular velocity detection axis A3 is applied during vibration of the vibrating arm in a drive vibration mode, a detection vibration mode is excited in the vibration arm due to Coriolis force and a detection signal according to the detection vibration mode is output. Accordingly, the angular velocity about each detection axis may be detected based on the detection signal output from the quartz crystal vibrator.

As shown in FIG. 3, the control apparatus 3 has the first motor control unit 30 and the second motor control unit 31 electrically coupled to the arm drive unit 26, the working head drive unit 28, and the inertial sensor 20 of the robot 2, and controlling actuation of these respective units. The robot 2 and the control apparatus 3 are electrically coupled by a cable. Note that, for example, the robot 2 and the control apparatus 3 may be coupled in wireless connection without the cable, not in wired connection. Further, a part or all of the control apparatus 3 may be provided inside of the robot 2.

The control apparatus 3 including the first motor control unit 30 and the second motor control unit 31 may be formed by e.g. a computer (PC: personal computer) with a CPU (Central Processing Unit) as an example of a processor built therein or the like. Thereby, the control apparatus 3 may control the individual parts of the robot 2.

Further, as shown in FIG. 3, the control apparatus 3 includes a memory unit 39 that stores various kinds of information (various conditions) and an input unit 38 for inputting various kinds of information (various conditions).

In the memory unit 39, e.g. programs for moving the robot 2, a control program for feedback control of the first motor 261 based on the angular velocity $\omega A3$ detected by the angular velocity sensor 201 when the arm 22 pivots about the second pivot axis J2, information input via the input unit 38, defined sensitivity correction amounts, etc. may be stored.

The input unit 38 may input information necessary for actions of the robot 2. The input unit 38 is not particularly limited to, but includes e.g. a keyboard, touch panel, or the like.

Figure 4:
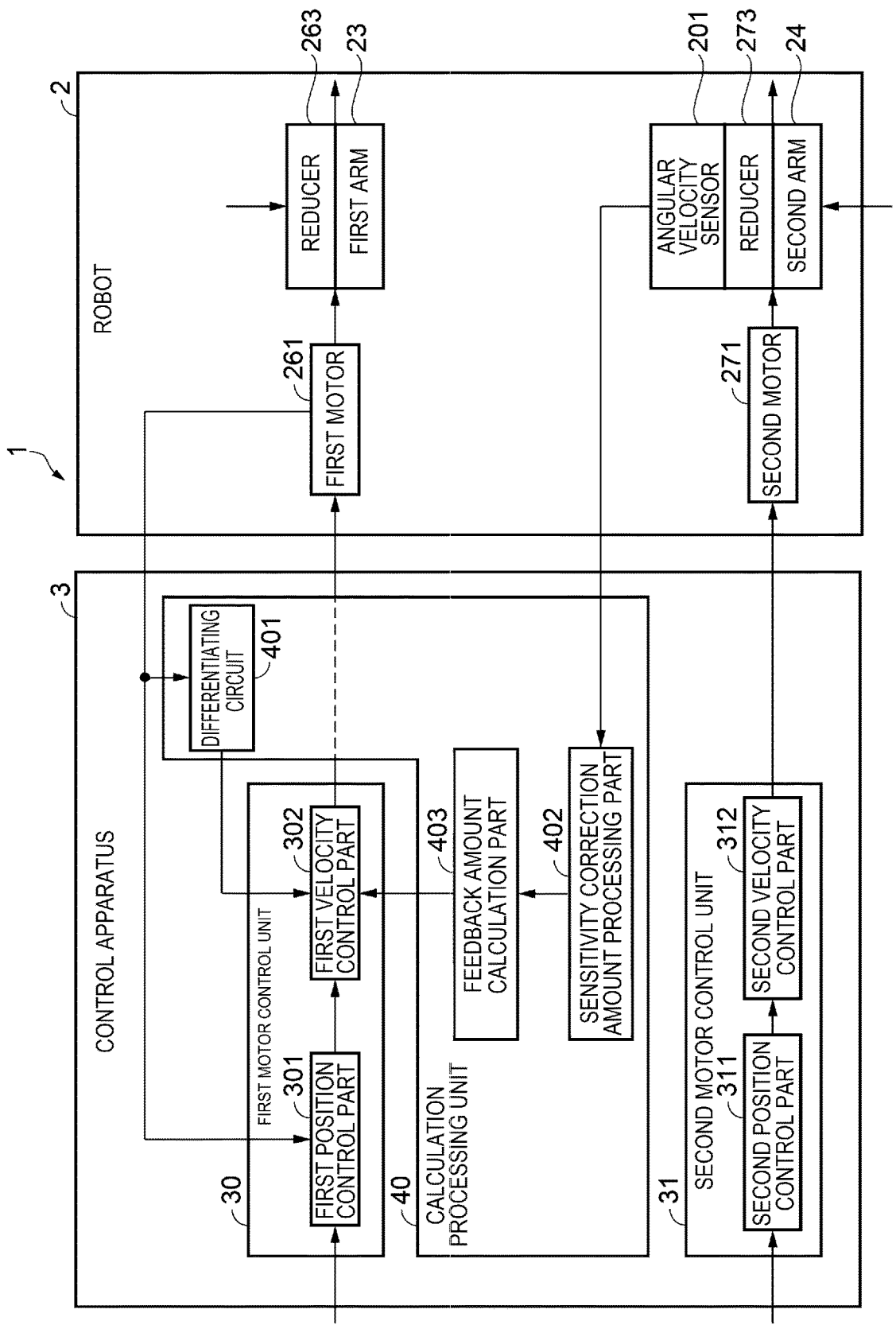
FIG. 4 is a block diagram showing a circuit system of the robot system according to the first embodiment.

1.2. Control Method and Control Apparatus for Suppression of Arm Vibration According to First Embodiment Next, a control method of suppressing the vibration of the spline shaft 253 about the third angular velocity detection axis A3 will be explained with reference to FIGS. 4, 5A, and 5B in addition to FIGS. 1 to 3. FIG. 3 is the block diagram showing the control system of the robot system according to the first embodiment. FIG. 4 is the block diagram showing the circuit system of the robot system according to the first embodiment. FIG. 5A is the view as seen in the direction of the arrow Q2 in FIG. 1 for explanation of action steps of the arm. FIG. 5B is the view as seen in the direction of the arrow Q1 in FIG. 1 for explanation of the action steps of the arm.

Note that the control method of suppressing the vibration of the arm in the embodiment to be described includes a detection step of detecting the angular velocity $\omega A3$ about the roll axis of the arm 22 by the angular velocity sensor 201 as the example of the inertial sensor 20 and a control step of controlling the first motor 261 based on the detected angular velocity.

The arm 22 including the first arm 23 and the second arm 24 pivots from an initial position shown in Step 1 in FIG. 5A to a predetermined angle about the first pivot axis J1 shown by an arrow a1 and, when stopping in a position of an arm 22a shown by dashed-two dotted lines, vibrates about the third angular velocity detection axis A3, i.e., in the roll direction of the arm 22. Step 2 in FIG. 5A shows the state of stoppage. Then, as shown in Step 2A and Step 2B in FIG. 5B, the spline shaft 253 provided in the distal end portion of the second arm 24 forming the arm 22 also vibrates about the third angular velocity detection axis A3 together with the second arm 24, for example, between a spline shaft 253a and a spline shaft 253aa as shown by an arrow b1. Note that, in FIG. 5B, a stop target position of the spline shaft 253 is shown by a position P. In the angular velocity sensor 201, the angular velocity $\omega A3$ equal to the vibration about the third angular velocity detection axis A3 may be detected.

When the second arm 24 forming the arm 22 vibrates about the third angular velocity detection axis A3, the larger the vibration, the larger the amplitude at the control point P1, in other words, the amount of displacement at the control point P1. As a result, it may be possible that the position of the control point P1 is not determined (see FIG. 5B: Step 2B). In this state, for example, to grip the object W by the end effector 4, the gripping may be difficult.

Accordingly, in the control apparatus 3, the control of the first motor 261 based on the angular velocity $\omega A3$ about the roll axis of the arm 22 detected by the angular velocity sensor 201, the so-called feedback control is performed to control the actuation of the first motor 261, and thereby, the vibration of the spline shaft 253 about the third angular velocity detection axis A3 is suppressed.

In the feedback control, the actuation of the first motor 261 is controlled so that the arm 22 may move based on the direction and the magnitude of the angular velocity $\omega A3$ about the roll axis of the arm 22 detected by the angular velocity sensor 201 in a direction in which the angular velocity $\omega A3$ is cancelled out. That is, the control apparatus 3 controls the actuation of the first motor 261 as velocity control and moves the arm 22a in a direction shown by an arrow a2 in Step 3 in FIG. 5A and Step 3 in FIG. 5B, and thereby, cancels out the angular velocity $\omega A3$. As a result, the spline shaft 253a provided in the distal end portion of the second arm 24a is located in a position of a spline shaft 253b of a second arm 24b shown in Step 3 in FIG. 5A and Step 3 in FIG. 5B.

Then, the control apparatus 3 controls the actuation of the first motor 261 as position control of the arm 22, moves an arm 22b to a position of an arm 22c in a direction shown by an arrow a3 in Step 4 in FIG. 5A and Step 4 in FIG. 5B, and stops a spline shaft 253c in the position P as the stop target position. As described above, the control apparatus 3 is configured to control so that the stop position of the control point P1 may be kept as fixed as possible by suppression of the vibration of the arm 22, i.e., the spline shaft 253.

Note that the control apparatus 3 may perform velocity control of controlling the actuation of the first motor 261 so that the arm 22 may move based on the angular velocity $\omega A3$ in a direction in which the angular velocity $\omega A3$ is cancelled out and position control of predicting displacement generated by the velocity control and moving the arm 22 to a target position, in parallel as feedback control.

As the above described configurations, as shown in FIG. 4, the control apparatus 3 has the first motor control unit 30, the second motor control unit 31, a differentiating circuit 401, a sensitivity correction amount processing part 402, and a feedback amount calculation part 403.

The first motor control unit 30 includes a first position control part 301 as a position control part and a first velocity control part 302 as a velocity control part, and controls the actuation of the first motor 261 that pivots the first arm 23 about the first pivot axis J1. Further, the first motor control unit 30 performs the so-called feedback control of controlling the first motor 261 based on the angular velocity ωA3 detected by the angular velocity sensor 201 when the arm 22 pivots about the second pivot axis J2. Here, the first motor 261 may pivot the first arm 23 via a reducer 263 by actuation control by the first motor control unit 30.

Specifically, the first velocity control part 302 controls the actuation of the first motor 261 so that the arm 22 may move based on the direction and the magnitude of the angular velocity ωA3 about the roll axis of the arm 22 detected by the angular velocity sensor 201 in a direction in which the angular velocity ωA3 is cancelled out. That is, the control apparatus 3 controls the actuation of the first motor 261 as velocity control and moves the arm 22 in a direction in which the angular velocity ωA3 is generated, and thereby, cancels out the angular velocity ωA3 and reduces the angular velocity ωA3.

Then, the first position control part 301 performs position control of returning to the target position by the distance of the movement by the first velocity control part 302 for cancelling out the angular velocity ωA3 and reducing the angular velocity ωA3. Thereby, the distal end portion of the second arm 24, in other words, the spline shaft 253 is moved to the target position.

In the above described manner, the first velocity control part 302 controls the velocity of the first motor 261 based on the output from the angular velocity sensor 201 to suppress the vibration of the second arm 24 about the roll axis due to the angular velocity ωA3, and the first position control part 301 moves the arm to the target position by the amount of displacement due to the vibration by position control. Thereby, the distal end portion of the second arm 24 may be brought to the target position more accurately in a shorter time.

The first position control part 301 is a part that generates a velocity command to the first motor 261 to pivot the first arm 23 about the first pivot axis J1 based on e.g. a position command stored in the memory unit 39 in advance.

The first velocity control part 302 is a part that generates a current command to drive the first motor 261 based on the velocity command generated in the first position control part 301.

The second motor control unit 31 includes a second position control part 311 as a position control part and a second velocity control part 312 as a velocity control part, and controls the actuation of the second motor 271 that pivots the second arm 24 about the first pivot axis J1. Here, the second motor 271 may pivot the second arm 24 via a reducer 273 by actuation control by the second motor control unit 31.

The second position control part 311 is a part that generates a velocity command to the second motor 271 to pivot the second arm 24 about the second pivot axis J2 based on e.g. a position command stored in the memory unit 39 in advance.

The second velocity control part 312 is a part that generates a current command to drive the second motor 271 based on the velocity command generated in the second position control part 311.

The differentiating circuit 401 is a part that differentiates the pivot angle about the first pivot axis J1 of the first arm 23 obtained by the output from the second encoder 272. An angular velocity command as a command generated by the differentiation is input to the first velocity control part 302 and superimposed on the current command to drive the first motor 261.

The sensitivity correction amount processing part 402 performs processing of multiplying the angular velocity ωA3 detected by the angular velocity sensor 201 by a defined sensitivity correction amount to obtain a control amount usable for feedback control. As the processing, in the embodiment, the angular velocity ωA3 is multiplied by a coefficient k1. Note that the coefficient k1 is an arbitrary numeric value larger than zero. For example, when 0<k1<1, the angular velocity ωA3 is decreased in the sensitivity correction amount processing part 402. On the other hand, when the correction in the sensitivity correction amount processing part 402 is omitted, the angular velocity ωA3 having the unchanged magnitude, i.e., without being decreased is input to the feedback amount calculation part 403 and, as a result, smooth pivot of the first arm 23 about the first pivot axis J1 may be difficult.

The feedback amount calculation part 403 calculates an angular velocity feedback value from the control amount based on the angular velocity ωA3 processed in the sensitivity correction amount processing part 402 and sends the value to the first velocity control part 302. That is, feedback based on the angular velocity ωA3 detected by the angular velocity sensor 201 is not performed on the first position control part 301, but performed on the first velocity control part 302.

Note that the robot 2 may be affected by disturbance vibration due to the pivot of the first arm 23 about the first pivot axis J1 and the pivot of the second arm 24 about the second pivot axis J2.

In the control method of controlling the robot 2, by the feedback control based on the angular velocity ωA3 detected by the angular velocity sensor 201, the first motor 261 pivoting the first arm 23 is brought into a drive state according to the position command and the velocity command. In the drive state, the movement about the third angular velocity detection axis A3 of the spline shaft 253 provided in the distal end portion of the second arm 24 may be cancelled out and the vibration may be suppressed. Thereby, the position of the spline shaft 253 is determined in a shorter time.

According to the robot system 1 of the above described first embodiment, the first motor control unit 30 performs feedback control on the first motor 261 based on the angular velocity ωA3 of the arm 22 about the roll axis detected by the angular velocity sensor 201 as the example of the inertial sensor 20. The feedback control controls the actuation of the first motor 261 to suppress the vibration of the arm 22 about the roll axis generated in the spline shaft 253 provided in the distal end portion of the second arm 24, and thereby, may suppress the vibration of the spline shaft 253 provided in the distal end portion of the second arm 24 and determine the position of the spline shaft 253 in the shorter time.

Note that, in the above description, the configuration example in which the angular velocity sensor 201 is provided at the distal end portion side of the second arm 24 is shown for explanation, however, the placement position of the angular velocity sensor 201 is not limited to that. The angular velocity sensor 201 may be provided in e.g. the working head 25 or the spline shaft 253 or provided in the first arm 23. When the angular velocity sensor 201 is provided in the first arm 23, it is desirable that the angular velocity sensor 201 is provided in a position as far as possible from the first pivot axis J1 as the pivot axis of the first arm 23 for improvement of the detection sensitivity thereof.

2. Second Embodiment

2.1. Overall Configuration of Robot System According to Second Embodiment

Figure 6:
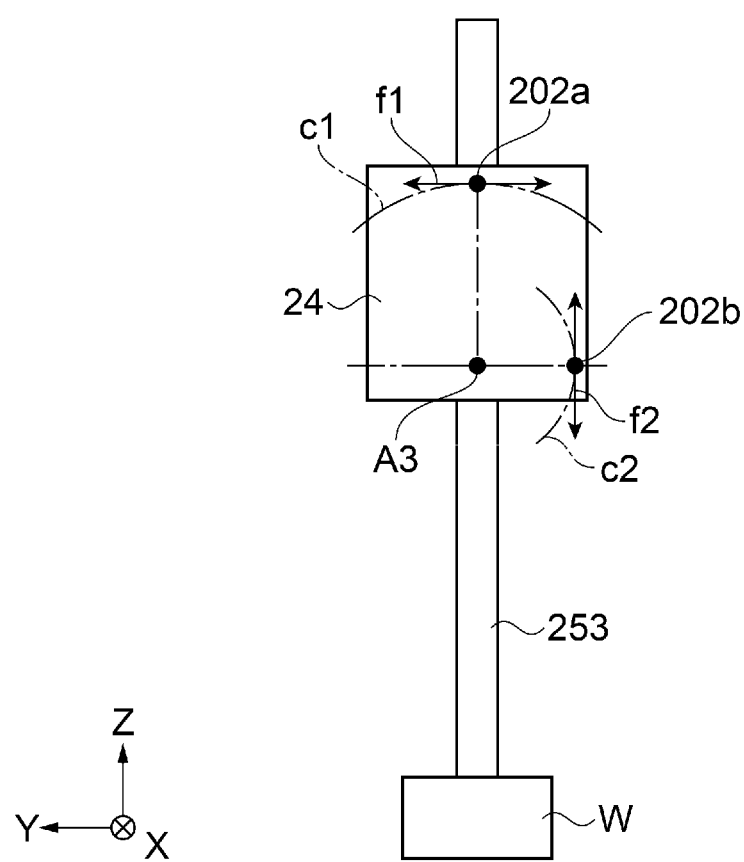
FIG. 6 is a schematic diagram for explanation of a placement example of acceleration sensors of a robot system according to a second embodiment.
Figure 7:
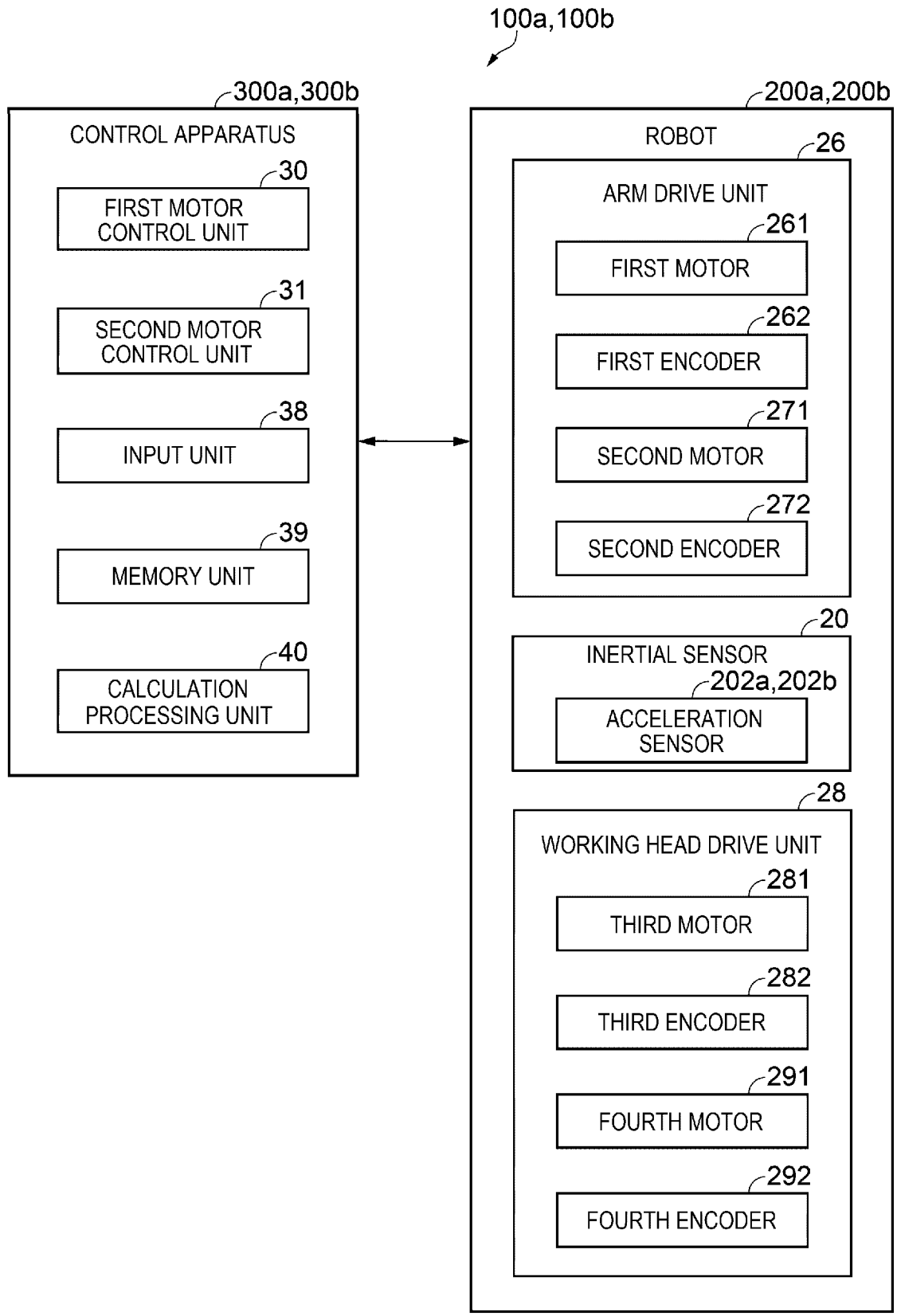
FIG. 7 is a block diagram showing a control system of the robot system according to the second embodiment.
Figure 8:
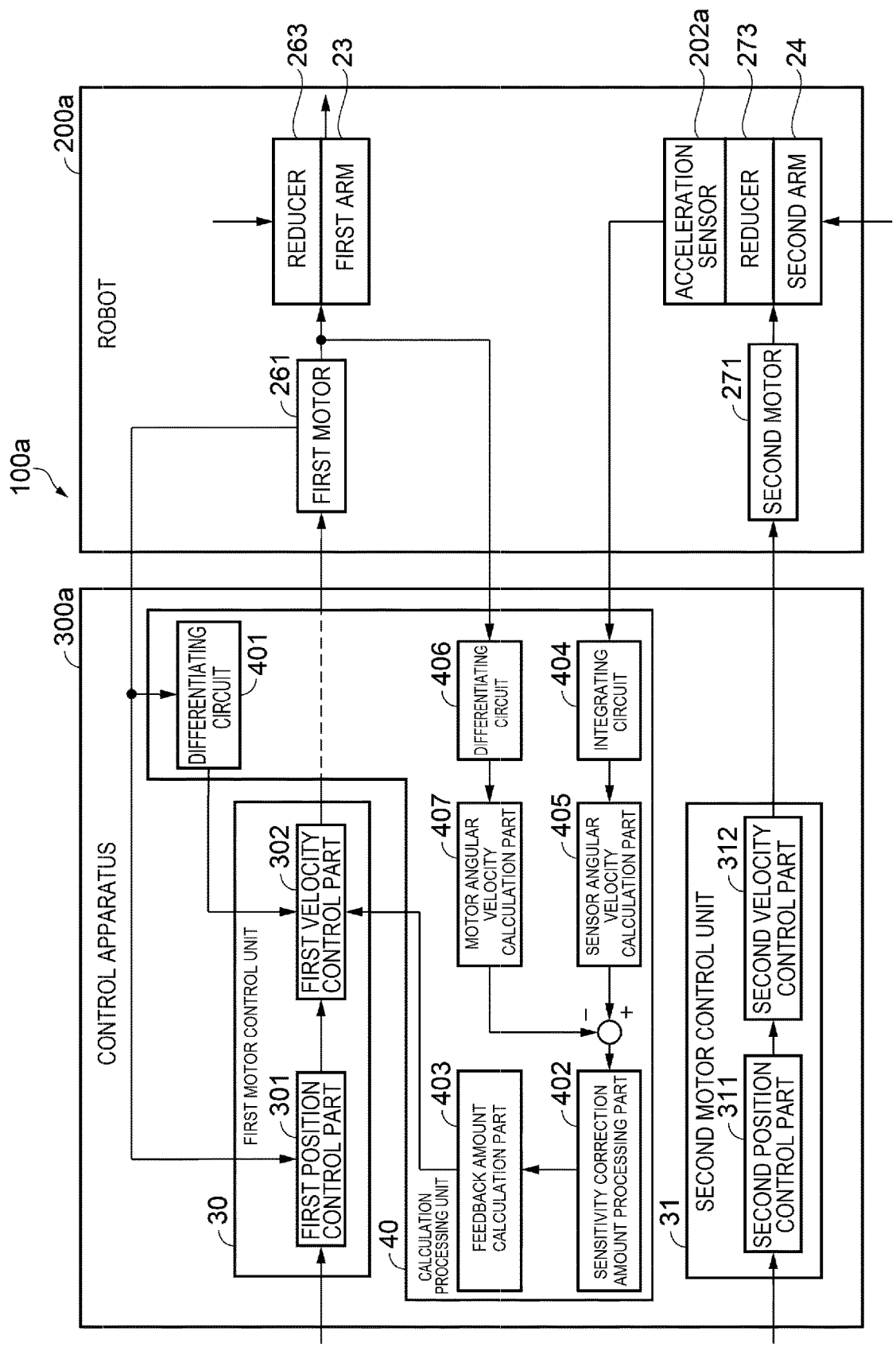
FIG. 8 is a block diagram showing Example 1 of a circuit system of the robot system according to the second embodiment.
Figure 9:
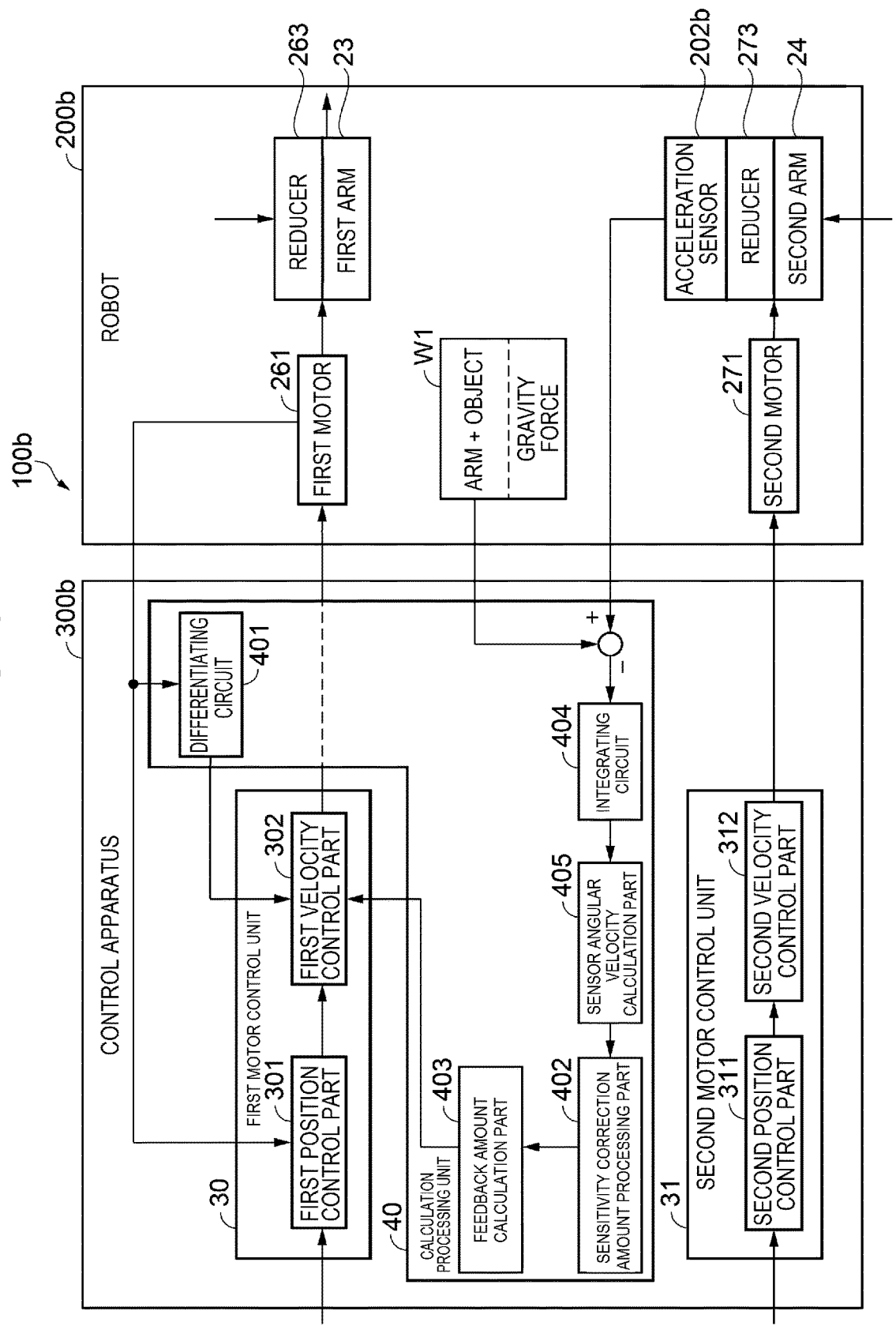
FIG. 9 is a block diagram showing Example 2 of the circuit system of the robot system according to the second embodiment.

Next, a configuration of a robot system according to the second embodiment will be explained with reference to FIGS. 6, 7, 8, and 9. FIG. 6 is the schematic diagram for explanation of the placement example of the acceleration sensors of the robot system according to the second embodiment. FIG. 7 is the block diagram showing the control system of the robot system according to the second embodiment. FIG. 8 is the block diagram showing Example 1 of the circuit system of the robot system according to the second embodiment. FIG. 9 is the block diagram showing Example 2 of the circuit system of the robot system according to the second embodiment.

As shown in FIG. 7, a robot system 100a, 100b according to the second embodiment is different from the robot system 1 according to the above described first embodiment in that an acceleration sensor 202a, 202b is used as the inertial sensor 20 provided in a robot 200a, 200b. Further, in the robot system 100a, 100b according to the second embodiment, a configuration of a control apparatus 300a, 300b is different. The rest of the configuration of the robot system 100a, 100b is the same as that of the robot system 1 according to the above described first embodiment. Therefore, as below, the detailed explanation of the same configurations as those of the robot system 1 may be omitted. Further, the same components as those of the robot system 1 will be explained with the same names and the same signs.

As shown in FIG. 7, the robot system 100a, 100b according to the second embodiment uses the acceleration sensor 202a, 202b as the inertial sensor 20 in the robot 200a, 200b. Note that it is desirable that the acceleration sensor 202a, 202b is attached to a position apart from the first pivot axis J1 of the first arm 23 and the second pivot axis J2 of the second arm 24 for detection of an acceleration in a twist direction as the roll direction of the arm 22.

Further, the acceleration sensor 202a, 202b detects the acceleration in the different direction depending on the attachment position thereof. FIG. 6 shows the attachment positions of the acceleration sensors 202a, 202b to the second arm 24 as seen from the direction of Q1 in FIG. 1. In FIG. 6, Example 1 in which the acceleration sensor 202a is attached to the upside of the third angular velocity detection axis A3 of the second arm 24 as the roll axis of the arm 22 and Example 2 in which the acceleration sensor 202b is attached onto the horizontal plane of the third angular velocity detection axis A3 of the second arm 24 are exemplified. Note that, in the second arm 24, the spline shaft 253 is provided along the Z direction as the vertical direction, and the object W is gripped at the lower end.

The acceleration sensor 202a according to Example 1 and the acceleration sensor 202b according to Example 2 detect accelerations in tangential directions f1, f2 of respective circles c1, c2 both around the third angular velocity detection axis A3 of the second arm 24 as the roll axis of the arm 22. Further, the control apparatus 300a, 300b to be described later performs the so-called feedback control of controlling the first motor 261 based on the acceleration detected by the acceleration sensor 202a, 202b, and controls the actuation of the first motor 261. By the control of the actuation of the first motor 261, the vibration generated in the spline shaft 253 of the working head 25 (see FIG. 2), e.g. the vibration at the control point P1 (see FIG. 2) at the end effector 4 side generated in the spline shaft 253 may be suppressed.

The robot 200a, 200b is a horizontal articulated robot also called a scalar robot. The configuration thereof is the same as the robot 2 of the first embodiment and the detailed explanation is omitted. Note that the robot 200a, 200b has the first arm 23 coupled to the base 21 and being pivotable about the first pivot axis J1 relative to the base 21, and the second arm 24 provided in the distal end portion of the first arm 23 and pivotably coupled about the second pivot axis J2 parallel to the first pivot axis J1 relative to the first arm 23. Note that, like the first embodiment, the first arm 23 contains a member having flexibility e.g. a resin or the like in a member forming the outer surface thereof.

As below, a configuration example of the acceleration sensor 202a according to Example 1 and a configuration example of the acceleration sensor 202b according to Example 2 will be sequentially explained. In the control method of suppressing the vibration of the arm in the embodiment to be described includes a detection step of detecting an acceleration about the roll axis of the arm 22 by the acceleration sensor 202a, 202b as the example of the inertial sensor 20 and a control step of controlling the first motor 261 based on the detected acceleration.

2.2. Control Method and Control Apparatus for Suppression of Arm Vibration According to Example 1

The acceleration sensor 202a forming the robot system 100a according to Example 1 of the second embodiment is, as shown in FIG. 6, attached to the upside of the third angular velocity detection axis A3 of the second arm 24 as the roll axis of the arm 22 and detects the acceleration in the tangential direction f1 of the circle c1 around the third angular velocity detection axis A3, i.e., the horizontal direction.

The acceleration sensor 202a that detects the acceleration in the horizontal direction is attached to the upside of the third angular velocity detection axis A3, and thereby, also detects an arm angular velocity by the robot arm driving as another component than the twist vibration component in the roll direction. To address the problem, in the robot system 100a, a difference between an arm distal end angular velocity calculated from the angular velocity of the first motor 261 and an arm distal end angular velocity in the placement location of the acceleration sensor 202a is obtained and used as a detection value of only the twist vibration component in the acceleration sensor 202a.

As shown in FIG. 8, the robot system 100a having the configuration according to Example 1 has the robot 200a and the control apparatus 300a. As shown in FIG. 7, the robot 200a has the arm drive unit 26, the working head drive unit 28, and the inertial sensor 20 having the same configurations as those of the first embodiment. The inertial sensor 20 in Example 1 is the acceleration sensor 202a.

The control apparatus 300a has the first motor control unit 30, the second motor control unit 31, the input unit 38, the memory unit 39, and a calculation processing unit 40 (see FIG. 7). The calculation processing unit 40 has the differentiating circuit 401, the sensitivity correction amount processing part 402, the feedback amount calculation part 403, an integrating circuit 404, a sensor angular velocity calculation part 405, a differentiating circuit 406, and a motor angular velocity calculation part 407.

The first motor control unit 30 includes the first position control part 301 and the first velocity control part 302, and controls the actuation of the first motor 261 that pivots the first arm 23 about the first pivot axis J1. Further, the first motor control unit 30 performs the so-called feedback control of controlling the first motor 261 based on the angular velocity calculated from the acceleration detected by the acceleration sensor 202a when the arm 22 pivots about the second pivot axis J2. Here, the first motor 261 may pivot the first arm 23 via the reducer 263 by actuation control by the first motor control unit 30.

Specifically, the first velocity control part 302 calculates the angular velocity from the acceleration detected by the acceleration sensor 202a and controls the actuation of the first motor 261 so that the arm 22 may move in a direction in which the angular velocity is cancelled out. That is, the control apparatus 300a controls the actuation of the first motor 261 as velocity control and moves the arm 22 in a direction in which the angular velocity is generated, and thereby, cancels out the angular velocity and reduces the angular velocity.

Then, the first position control part 301 performs position control of returning to the target position by the distance of the movement by the first velocity control part 302 for cancelling out and reducing the angular velocity. Thereby, the distal end portion of the second arm 24, in other words, the spline shaft 253 is moved to the target position.

In the above described manner, the first velocity control part 302 controls the velocity of the first motor 261 based on the output from the acceleration sensor 202a to suppress the vibration of the second arm 24 about the roll axis due to the angular velocity, and the first position control part 301 moves the arm to the target position by the amount of displacement due to the vibration by position control. Thereby, the distal end portion of the second arm 24 may be brought to the target position more accurately in a shorter time.

The first position control part 301 is a part that generates a velocity command to the first motor 261 to pivot the first arm 23 about the first pivot axis J1 based on e.g. a position command stored in the memory unit 39 in advance.

The first velocity control part 302 is a part that generates a current command to drive the first motor 261 based on the velocity command generated in the first position control part 301.

The second motor control unit 31 includes the second position control part 311 and the second velocity control part 312, and controls the actuation of the second motor 271 that pivots the second arm 24 about the first pivot axis J1. Here, the second motor 271 may pivot the second arm 24 via the reducer 273 by actuation control by the second motor control unit 31.

The second position control part 311 is a part that generates a velocity command to the second motor 271 to pivot the second arm 24 about the second pivot axis J2 based on e.g. a position command stored in the memory unit 39 in advance.

The second velocity control part 312 is a part that generates a current command to drive the second motor 271 based on the velocity command generated in the second position control part 311.

The differentiating circuit 401 is a part that differentiates the pivot angle about the first pivot axis J1 of the first arm 23 obtained by the output from the second encoder 272. An angular velocity command as a command generated by the differentiation is input to the first velocity control part 302 and superimposed on the current command to drive the first motor 261.

The integrating circuit 404 is a part that integrates a distal end acceleration of the distal end portion of the second arm 24, i.e., the distal end portion of the arm 22 obtained by the acceleration sensor 202a and converts the acceleration into velocity information. A distal end velocity as the velocity information in the horizontal direction of the arm 22 distal end generated by the integration is input to the sensor angular velocity calculation part 405 and converted into a sensor angular velocity in the horizontal direction of the arm 22 distal end.

The sensor angular velocity calculation part 405 calculates the sensor angular velocity in the horizontal direction in the distal end portion of the arm 22 by processing of the distal end velocity of the arm 22 output from the integrating circuit 404 using 1/L. Here, as shown in FIG. 1, L is a distance from the first pivot axis J1 of the first motor 261 to the acceleration sensor 202a.

The differentiating circuit 406 is a part that differentiates the pivot angle about the first pivot axis J1 of the first arm 23 obtained by the output from the second encoder 272.

The motor angular velocity calculation part 407 multiplies the differential value of the pivot angle about the first pivot axis J1 in the first arm 23 output from the differentiating circuit 406 by a reduction ratio of the reducer 263 to calculate the motor angular velocity in the distal end portion of the arm 22.

Then, the calculation processing unit 40 obtains a difference between the sensor angular velocity calculated by the sensor angular velocity calculation part 405 and the motor angular velocity calculated by the motor angular velocity calculation part 407, and generates an angular velocity of only the vibration component about the roll axis of the arm 22.

The sensitivity correction amount processing part 402 performs processing of multiplying the angular velocity of only the vibration component about the roll axis of the arm 22 calculated by the integrating circuit 404, the sensor angular velocity calculation part 405, the differentiating circuit 406, and the motor angular velocity calculation part 407 from the acceleration detected by the acceleration sensor 202a by a defined sensitivity correction amount to obtain a control amount usable for feedback control. As the processing, in the embodiment, the angular velocity is multiplied by a coefficient k1. Note that the coefficient k1 is an arbitrary numeric value larger than zero. For example, when 0<k1<1, the angular velocity is decreased in the sensitivity correction amount processing part 402. On the other hand, when the correction in the sensitivity correction amount processing part 402 is omitted, the angular velocity having the unchanged magnitude, i.e., without being decreased is input to the feedback amount calculation part 403 and, as a result, smooth pivot of the first arm 23 about the first pivot axis J1 may be difficult.

The feedback amount calculation part 403 calculates an angular velocity feedback value from the control amount based on the angular velocity of the vibration component in the horizontal direction processed in the sensitivity correction amount processing part 402 and sends the value to the first velocity control part 302. That is, feedback based on the angular velocity of the vibration component in the horizontal direction calculated from the acceleration detected by the acceleration sensor 202a is not performed on the first position control part 301, but performed on the first velocity control part 302.

In the control method of the robot system 100a using the above described robot 200a and control apparatus 300a, by the feedback control based on the angular velocity of the vibration component in the horizontal direction calculated from the acceleration detected by the acceleration sensor 202a, the first motor 261 pivoting the first arm 23 is brought into a drive state according to the position command and the velocity command. In the drive state, the movement about the third angular velocity detection axis A3 of the spline shaft 253 provided in the distal end portion of the second arm 24 may be cancelled out and the vibration may be suppressed. Thereby, the position of the spline shaft 253 is determined in a shorter time.

As above, according to the robot system 100a of Example 1 of the above described second embodiment, the first motor control unit 30 performs feedback control on the first motor 261 based on the angular velocity of the vibration component in the horizontal direction calculated from the acceleration of the arm 22 in the horizontal direction detected by the acceleration sensor 202a as the example of the inertial sensor 20. The feedback control controls the actuation of the first motor 261 to suppress the vibration of the arm 22 about the roll axis generated in the spline shaft 253 provided in the distal end portion of the second arm 24, and thereby, may suppress the vibration of the spline shaft 253 provided in the distal end portion of the second arm 24 and determine the position of the spline shaft 253.

2.3. Control Method and Control Apparatus for Suppression of Arm Vibration According to Example 2

The acceleration sensor 202b forming the robot system 100b according to Example 2 of the second embodiment is, as shown in FIG. 6, attached to the horizontal plane along the Y-axis in the drawing of the third angular velocity detection axis A3 of the second arm 24 as the roll axis of the arm 22 and detects the acceleration in the tangential direction f2 of the circle c2 around the third angular velocity detection axis A3, i.e., the vertical direction.

The acceleration sensor 202b that detects the acceleration in the vertical direction is attached to the horizontal plane of the third angular velocity detection axis A3, and it is necessary to consider the influence by a gravity force W1 and constantly obtain a difference from the gravity force. To address the problem, in the robot system 100b, a difference between the acceleration detected by the acceleration sensor 202b and the gravity force W1 on the object W gripped by the arm 22 is obtained and used as a detection value of only the twist vibration component in the acceleration sensor 202b.

The calculation processing unit 40 obtains the difference between the acceleration detected by the acceleration sensor 202b and the gravity force W1 and inputs the difference value as the detection value of only the twist vibration component in the acceleration sensor 202b to the integrating circuit 404.

As shown in FIG. 9, the robot system 100b having the configuration according to Example 2 has the robot 200b and the control apparatus 300b. The robot 200b has the arm drive unit 26 and the working head drive unit 28 having the same configurations as those of the first embodiment, and the acceleration sensor 202b as the inertial sensor 20 (see FIG. 7).

The control apparatus 300b has the first motor control unit 30, the second motor control unit 31, the input unit 38, the memory unit 39, and the calculation processing unit 40 (see FIG. 7). The calculation processing unit 40 has the differentiating circuit 401, the sensitivity correction amount processing part 402, the feedback amount calculation part 403, the integrating circuit 404, and the sensor angular velocity calculation part 405.

The first motor control unit 30 includes the first position control part 301 as the position control part and the first velocity control part 302 as the velocity control part, and controls the actuation of the first motor 261 that pivots the first arm 23 about the first pivot axis J1. Further, the first motor control unit 30 performs feedback control on the first motor 261 based on the angular velocity calculated from the acceleration detected by the acceleration sensor 202b when the arm 22 pivots about the second pivot axis J2. Here, the first motor 261 may pivot the first arm 23 via the reducer 263 by actuation control by the first motor control unit 30.

Specifically, the first velocity control part 302 calculates the angular velocity from the acceleration detected by the acceleration sensor 202b and controls the actuation of the first motor 261 so that the arm 22 may move in a direction in which the angular velocity is cancelled out. That is, the control apparatus 300b controls the actuation of the first motor 261 as velocity control and moves the arm 22 in a direction in which the angular velocity is generated, and thereby, cancels out the angular velocity and reduces the angular velocity.

Then, the first position control part 301 performs position control of returning to the target position by the distance of the movement by the first velocity control part 302 for cancelling out and reducing the angular velocity. Thereby, the distal end portion of the second arm 24, in other words, the spline shaft 253 is moved to the target position.

In the above described manner, the first velocity control part 302 controls the velocity of the first motor 261 based on the output from the acceleration sensor 202b to suppress the vibration of the second arm 24 about the roll axis due to the angular velocity, and the first position control part 301 moves the arm to the target position by the amount of displacement due to the vibration by position control. Thereby, the distal end portion of the second arm 24 may be brought to the target position more accurately in a shorter time.

The first position control part 301 is a part that generates a velocity command to the first motor 261 to pivot the first arm 23 about the first pivot axis J1 based on e.g. a position command stored in the memory unit 39 in advance.

The first velocity control part 302 is a part that generates a current command to drive the first motor 261 based on the velocity command generated in the first position control part 301.

The second motor control unit 31 includes the second position control part 311 and the second velocity control part 312, and controls the actuation of the second motor 271 that pivots the second arm 24 about the first pivot axis J1. Here, the second motor 271 may pivot the second arm 24 via the reducer 273 by actuation control by the second motor control unit 31.

The second position control part 311 is a part that generates a velocity command to the second motor 271 to pivot the second arm 24 about the second pivot axis J2 based on e.g. a position command stored in the memory unit 39 in advance.

The second velocity control part 312 is a part that generates a current command to drive the second motor 271 based on the velocity command generated in the second position control part 311.

The differentiating circuit 401 is a part that differentiates the pivot angle about the first pivot axis J1 of the first arm 23 obtained by the output from the second encoder 272. An angular velocity command as a command generated by the differentiation is input to the first velocity control part 302 and superimposed on the current command to drive the first motor 261.

The integrating circuit 404 is a part that integrates the detection value of the difference between a distal end acceleration of the distal end portion of the second arm 24, i.e., the distal end portion of the arm 22 obtained by the acceleration sensor 202b and the gravity force W1 and converts the value into velocity information. A distal end velocity as the velocity information in the vertical direction of the distal end of the arm 22 generated by the integration is input to the sensor angular velocity calculation part 405 and converted into a sensor angular velocity in the horizontal direction of the arm 22 distal end.

The sensor angular velocity calculation part 405 calculates the sensor angular velocity in the vertical direction in the distal end portion of the arm 22 from the distal end velocity of the arm 22 output from the integrating circuit 404.

The sensitivity correction amount processing part 402 performs processing of multiplying the angular velocity of only the vibration component about the roll axis of the arm 22 calculated by the integrating circuit 404 and the sensor angular velocity calculation part 405 from the acceleration detected by the acceleration sensor 202b by a defined sensitivity correction amount to obtain a control amount usable for feedback control. As the processing, in the embodiment, the angular velocity is multiplied by a coefficient k1. Note that the coefficient k1 is an arbitrary numeric value larger than zero. For example, when 0<k1<1, the angular velocity is decreased in the sensitivity correction amount processing part 402. On the other hand, when the correction in the sensitivity correction amount processing part 402 is omitted, the angular velocity having the unchanged magnitude, i.e., without being decreased is input to the feedback amount calculation part 403 and, as a result, smooth pivot of the first arm 23 about the first pivot axis J1 may be difficult.

The feedback amount calculation part 403 calculates an angular velocity feedback value from the control amount based on the angular velocity of the vibration component in the vertical direction processed in the sensitivity correction amount processing part 402 and sends the value to the first velocity control part 302. That is, feedback based on the angular velocity of the vibration component in the vertical direction calculated from the acceleration detected by the acceleration sensor 202b is not performed on the first position control part 301, but performed on the first velocity control part 302.

In the control method of the robot system 100b using the above described robot 200b and control apparatus 300b, by the feedback control based on the angular velocity of the vibration component in the vertical direction along the Z-axis in FIG. 6 calculated from the acceleration detected by the acceleration sensor 202b, the first motor 261 pivoting the first arm 23 is brought into a drive state according to the position command and the velocity command. In the drive state, the movement about the third angular velocity detection axis A3 of the spline shaft 253 provided in the distal end portion of the second arm 24 may be cancelled out and the vibration may be suppressed. Thereby, the position of the spline shaft 253 is determined in a shorter time.

As above, according to the robot system 100b of Example 2 of the above described second embodiment, the first motor control unit 30 performs feedback control on the first motor 261 based on the angular velocity of the vibration component in the vertical direction calculated from the acceleration of the arm 22 in the vertical direction detected by the acceleration sensor 202b as the example of the inertial sensor 20. The feedback control controls the actuation of the first motor 261 to suppress the vibration of the arm 22 about the roll axis generated in the spline shaft 253 provided in the distal end portion of the second arm 24, and thereby, may suppress the vibration of the spline shaft 253 provided in the distal end portion of the second arm 24 and determine the position of the spline shaft 253.

Note that the above described first embodiment and second embodiment, the configurations of the robot systems 1, 100a, 100b are explained as the configurations in which the control apparatuses 3, 300a, 300b are provided outside of the robots 2, 200a, 200b, however, not limited to those. The control apparatuses 3, 300a, 300b may be provided outside or inside of the robots 2, 200a, 200b.

In the above described first embodiment and second embodiment, the configuration in which the inertial sensor 20 is provided in the second arm 24 is explained, however, not limited to that. The inertial sensor 20 may be provided in the spline shaft 253 forming the working head 25.

The feedback control by the robot system 1 is preferable for a robot with an arm having a configuration easily torsionally displaced like the first arm 23 containing a member having flexibility in the outer surface thereof including the robots 2, 200a, 200b.

As below, the details derived from the above described embodiments will be described as respective embodiments.

Embodiment 1

A robot system according to an embodiment includes a robot having a base, an arm including a first arm coupled to the base and pivoting about a first pivot axis and a second arm coupled to the first arm and pivoting about a second pivot axis parallel to the first pivot axis, a first motor pivoting the first arm about the first pivot axis, and a second motor pivoting the second arm about the second pivot axis, and a control apparatus having a first motor control unit that controls the first motor, wherein the robot has an inertial sensor that detects an angular velocity about a roll axis of the arm or an acceleration in a tangential direction of a circle around the roll axis, and the first motor control unit controls the first motor based on output from the inertial sensor.

According to the robot system of the embodiment, the first motor control unit performs the so-called feedback control of controlling the first motor based on the output from the inertial sensor, in other words, the angular velocity about the roll axis of the arm or the acceleration in the tangential direction of the circle around the roll axis detected by the inertial sensor. The feedback control controls the actuation of the first motor to suppress the vibration of the second arm about the roll axis, and thereby, may suppress the vibration of the second arm about the roll axis.

Embodiment 2

In the robot system according to the embodiment, the inertial sensor may be provided in the second arm.

According to the embodiment, the inertial sensor is provided in the second arm, and thereby, a distance between the first motor and the inertial sensor increases, the vibration of the second arm about the roll axis may be detected in a part with larger vibration, and detection sensitivity may be improved.

Embodiment 3

In the robot system according to the embodiment, a member forming an outer surface of the first arm may contain a resin.

According to the embodiment, contact impact with the first arm may be reduced by buffer action due to flexibility of the resin forming the outer surface of the first arm. Even when the outer surface of the first arm is formed using the resin having the buffer action, the vibration of the second arm about the roll axis may be suppressed by feedback control based on the detection result of the inertial sensor.

Embodiment 4

In the robot system according to the embodiment, the first motor control unit may have a velocity control part that velocity-controls the first motor based on the output from the inertial sensor.

According to the embodiment, the velocity control part controls the velocity of the first motor based on the output from the inertial sensor, and thereby, the angular velocity of the second arm about the roll axis may be reduced and the vibration of the second arm about the roll axis due to the angular velocity may be suppressed.

Embodiment 5

In the robot system according to the embodiment, the first motor control unit may have a position control part that position-controls the first motor, and the velocity control part may reduce the angular velocity by the velocity control and the position control part may move the second arm to a target position by the position control.

According to the embodiment, the velocity control part controls the velocity of the first motor based on the output from the inertial sensor, and thereby, the vibration of the second arm about the roll axis due to the angular velocity may be suppressed and the position control part moves the arm to the target position by the amount of displacement due to the vibration by position control. Thereby, the second arm may be brought to the target position more accurately in a shorter time.

Embodiment 6

A control apparatus according to an embodiment is a control apparatus controlling a robot having a base, an arm including a first arm coupled to the base and pivoting about a first pivot axis and a second arm coupled to the first arm and pivoting about a second pivot axis parallel to the first pivot axis, a first motor pivoting the first arm about the first pivot axis, and a second motor pivoting the second arm about the second pivot axis, and including a first motor control unit that controls the first motor, wherein the robot has an inertial sensor that detects an angular velocity about a roll axis of the arm or an acceleration in a tangential direction of a circle around the roll axis, and the first motor control unit controls the first motor based on the angular velocity or the acceleration.

According to the control apparatus of the embodiment, the first motor control unit performs the so-called feedback control of controlling the first motor of the robot based on the angular velocity about the roll axis of the first arm or second arm contained in the arm or the acceleration in the tangential direction of the circle around the roll axis detected by the inertial sensor of the robot. The feedback control by the first motor control unit controls the actuation of the first motor of the robot to suppress the vibration of the second arm of the robot about the roll axis, and thereby, may suppress the vibration of the second arm about the roll axis.

Embodiment 7

In the control apparatus according to the embodiment, the first motor control unit may have a velocity control part that velocity-controls the first motor based on the output from the inertial sensor.

According to the embodiment, the first motor control unit controls the velocity of the first motor based on the output from the inertial sensor in the feedback control, and thereby, may suppress the vibration of the second arm about the roll axis due to the angular velocity.

Embodiment 8

In the control apparatus according to the embodiment, the first motor control unit may perform position control of controlling a position of the first motor, reduce the angular velocity by the velocity control, and move the second arm to a target position by the position control.

According to the embodiment, the first motor control unit reduces the angular velocity of the second arm about the roll axis by the velocity control of the first motor based on the output from the inertial sensor to suppress the vibration of the second arm about the roll axis due to the angular velocity, and moves the arm to the target position by the amount of displacement due to the vibration by the position control of the first motor. Thereby, the second arm may be brought to the target position more accurately in a shorter time.

Embodiment 9

A control method according to an embodiment is a control method of controlling a robot having an arm, a motor pivoting the arm, and an inertial sensor provided in the arm, including a detection step of detecting an angular velocity about a roll axis of the armor an acceleration in a tangential direction of a circle around the roll axis using the inertial sensor, and a control step of controlling the motor based on the detected angular velocity or acceleration.

According to the control method of the embodiment, the robot performs the so-called feedback control of controlling the motor based on the angular velocity about the roll axis of the arm or the acceleration in the tangential direction of the circle around the roll axis detected by the inertial sensor. The feedback control controls the actuation of the motor to suppress the vibration of the arm about the roll axis, and thereby, may suppress the vibration of the arm of the robot about the roll axis.

Embodiment 10

In the control method according to the embodiment, at the control step, a velocity of the motor may be controlled based on output from the inertial sensor.

According to the embodiment, the velocity of the motor is feedback-controlled based on the output from the inertial sensor, and thereby, the vibration of the arm about the roll axis due to the angular velocity may be suppressed.

Embodiment 11

In the control method according to the embodiment, at the control step, the angular velocity may be reduced by the velocity control and the arm may be moved to a target position by position control of controlling a position of the motor.

According to the embodiment, the angular velocity of the arm about the roll axis is reduced by the velocity control of the motor based on the output from the inertial sensor and the vibration of the arm about the roll axis due to the angular velocity is suppressed, and the arm is moved by the amount of displacement due to the vibration to the target position by the position control of the motor. Thereby, the arm may be brought to the target position more accurately in a shorter time.

What is claimed is:

1. A robot system comprising:
   a robot having a base, an arm including a first arm coupled to the base and pivoting about a first pivot axis and a second arm coupled to the first arm and pivoting about a second pivot axis parallel to the first pivot axis, a first motor pivoting the first arm about the first pivot axis, and a second motor pivoting the second arm about the second pivot axis; and
   a control apparatus having a first motor control unit that controls the first motor, wherein
   the robot has an inertial sensor that detects an acceleration in a tangential direction of a circle around a roll axis of the arm, wherein the roll axis corresponds to a longitudinal axis of the second arm orthogonal to the second pivot axis, and
   the first motor control unit controls the first motor based on output from the inertial sensor corresponding to the detected acceleration in the tangential direction of the circle around the roll axis.

2. The robot system according to claim 1, wherein the inertial sensor is provided in the second arm.

3. The robot system according to claim 1, wherein a member forming an outer surface of the first arm contains a resin.

4. The robot system according to claim 1, wherein the first motor control unit has a velocity control part that velocity-controls the first motor based on the output from the inertial sensor.

5. The robot system according to claim 4, wherein the first motor control unit has a position control part that position-controls the first motor, and
   the velocity control part reduces an angular velocity by the velocity control and the position control part moves the second arm to a target position by the position control.

6. A control apparatus controlling a robot having a base, an arm including a first arm coupled to the base and pivoting about a first pivot axis and a second arm coupled to the first arm and pivoting about a second pivot axis parallel to the first pivot axis, a first motor pivoting the first arm about the first pivot axis, and a second motor pivoting the second arm about the second pivot axis, and comprising a first motor control unit that controls the first motor, wherein
   the robot has an inertial sensor that detects an acceleration in a tangential direction of a circle around a roll axis of the arm, wherein the roll axis corresponds to a longitudinal axis of the second arm orthogonal to the second pivot axis, and
   the first motor control unit controls the first motor based on the detected acceleration in the tangential direction of the circle around the roll axis.

7. The control apparatus according to claim 6, wherein the first motor control unit has a velocity control part that velocity-controls the first motor based on output from the inertial sensor.

8. The control apparatus according to claim 7, wherein the first motor control unit performs position control of controlling a position of the first motor, and reduces an angular velocity by the velocity control and moves the second arm to a target position by the position control.

9. A control method of controlling a robot having an arm, a motor pivoting the arm about a pivot axis, and an inertial sensor provided in the arm, comprising:
   a detection step of detecting an acceleration in a tangential direction of a circle around a roll axis of the arm using the inertial sensor, wherein the roll axis corresponds to a longitudinal axis of the arm orthogonal to the pivot axis; and
   a control step of controlling the motor based on the detected acceleration in the tangential direction of the circle around the roll axis.

10. The control method according to claim 9, wherein at the control step, a velocity of the motor is controlled based on output from the inertial sensor.

11. The control method according to claim 10, wherein at the control step, an angular velocity is reduced by velocity control and the arm is moved to a target position by position control of controlling a position of the motor.

* * * * *